United States Patent
Kirschner et al.

(10) Patent No.: US 8,522,668 B2
(45) Date of Patent: Sep. 3, 2013

(54) SYSTEMS AND METHODS FOR ON DEMAND ICED TEA

(75) Inventors: Jonathan Kirschner, Powder Spring, GA (US); Douglas John Franck, Kennesaw, GA (US); Shaun Blaise Gatipon, Kennesaw, GA (US); Kenneth George Smazik, Kennesaw, GA (US); Wolfgang Fischer, Deerfield, FL (US)

(73) Assignee: The Coca-Cola Company, Atlanta, GA (US)

(*) Notice: Subject to any disclaimer, the term of this patent is extended or adjusted under 35 U.S.C. 154(b) by 457 days.

(21) Appl. No.: 12/580,437

(22) Filed: Oct. 16, 2009

(65) Prior Publication Data
US 2010/0107885 A1      May 6, 2010

Related U.S. Application Data

(63) Continuation-in-part of application No. 12/188,250, filed on Aug. 8, 2008.

(51) Int. Cl.
*A47J 31/40*       (2006.01)

(52) U.S. Cl.
USPC .................. 99/279; 99/297; 99/294; 99/299; 99/300; 99/302 P

(58) Field of Classification Search
USPC ................. 99/279, 297, 294, 299, 300, 302 P
See application file for complete search history.

(56) References Cited

U.S. PATENT DOCUMENTS

| | | |
|---|---|---|
| 2,968,560 A | 1/1961 | Goros |
| 3,589,272 A | 6/1971 | Bouladon et al. |
| 3,812,273 A | 5/1974 | Schmidt |
| 3,823,656 A | 7/1974 | Vander Veken |
| 3,952,641 A | 4/1976 | Vitous |
| 4,158,330 A | 6/1979 | Vitous |
| 4,254,694 A | 3/1981 | Illy |
| 4,429,623 A | 2/1984 | Illy |
| 4,471,689 A | 9/1984 | Pana |
| 4,579,048 A | 4/1986 | Stover |
| 4,581,239 A | 4/1986 | Woolman et al. |
| 4,644,855 A | 2/1987 | Woolman et al. |
| 4,757,752 A | 7/1988 | Robins et al. |

(Continued)

FOREIGN PATENT DOCUMENTS

| | | |
|---|---|---|
| BE | 701863 | 1/1968 |
| EP | 0 326 099 A1 | 1/1989 |

(Continued)

OTHER PUBLICATIONS

Hyne, Norman J. Dictionary of Petroleum Exploration, Drillings and Production, Penn Well Publishing Company, 1991, pp. 29.*

(Continued)

*Primary Examiner* — Humera Sheikh
*Assistant Examiner* — Hong T Yoo
(74) *Attorney, Agent, or Firm* — Sutherland Asbill & Brennan LLP

(57) ABSTRACT

A beverage brewing system for producing on demand iced tea. The beverage brewing system may include a concentrated beverage brewer, one or more brew water circuits in communication with the concentrated beverage brewer, one or more makeup water circuits, and one or more back pressure valves in communication with the brew water circuits and the makeup water circuits.

22 Claims, 7 Drawing Sheets

(56) References Cited

U.S. PATENT DOCUMENTS

| | | | |
|---|---|---|---|
| 4,829,889 A | 5/1989 | Takeuchi et al. | |
| 4,846,052 A | 7/1989 | Favre et al. | |
| 4,860,645 A | 8/1989 | van der Lijn et al. | |
| 4,886,674 A | 12/1989 | Seward et al. | |
| 4,920,871 A * | 5/1990 | Anson et al. | 99/295 |
| 4,941,399 A | 7/1990 | Zucchetti | |
| 2,995,978 A | 2/1991 | Van de Gang | |
| 4,995,310 A | 2/1991 | van der Lijn et al. | |
| 5,116,632 A | 5/1992 | Miller | |
| 5,134,924 A | 8/1992 | Vicker | |
| 5,190,652 A | 3/1993 | van Thoor et al. | |
| 5,197,374 A | 3/1993 | Fond | |
| 5,267,506 A | 12/1993 | Cai | |
| 5,325,765 A | 7/1994 | Sylvan et al. | |
| 5,343,799 A | 9/1994 | Fond | |
| 5,347,916 A | 9/1994 | Fond et al. | |
| 5,398,595 A | 3/1995 | Fond et al. | |
| 5,398,596 A | 3/1995 | Fond | |
| 5,402,707 A | 4/1995 | Fond et al. | |
| 5,472,719 A | 12/1995 | Favre | |
| 5,505,120 A | 4/1996 | Albertson | |
| 5,637,335 A | 6/1997 | Fond et al. | |
| 5,638,741 A | 6/1997 | Cisaria | |
| 5,656,311 A | 8/1997 | Fond | |
| 5,715,742 A | 2/1998 | Cheich et al. | |
| 5,733,591 A | 3/1998 | Goerndt | |
| 5,840,189 A | 11/1998 | Sylvan et al. | |
| 5,855,161 A | 1/1999 | Cortese | |
| 5,897,899 A | 4/1999 | Fond | |
| 5,948,455 A | 9/1999 | Schaeffer | |
| 5,992,298 A | 11/1999 | Illy et al. | |
| 6,079,315 A | 6/2000 | Beaulieu et al. | |
| 6,082,247 A | 7/2000 | Beaulieu | |
| 6,095,032 A | 8/2000 | Barnett et al. | |
| 6,103,116 A | 8/2000 | Koslow et al. | |
| 6,135,009 A | 10/2000 | Lassota | |
| 6,142,063 A | 11/2000 | Beaulieu et al. | |
| 6,182,554 B1 | 2/2001 | Beaulieu et al. | |
| 6,182,555 B1 | 2/2001 | Scheer et al. | |
| 6,186,051 B1 | 2/2001 | Aarts | |
| 6,220,147 B1 | 4/2001 | Priley | |
| 6,250,208 B1 | 6/2001 | Helps et al. | |
| 6,274,187 B1 | 8/2001 | Lehmberg et al. | |
| 6,405,637 B1 | 6/2002 | Cai | |
| 6,413,570 B1 | 7/2002 | Lehmberg et al. | |
| 6,423,361 B1 | 7/2002 | Lehmberg et al. | |
| 6,423,362 B1 | 7/2002 | Lehmberg et al. | |
| 6,440,256 B1 | 8/2002 | Gordon et al. | |
| 6,488,976 B1 | 12/2002 | Priley | |
| 6,517,880 B2 | 2/2003 | Walters, Jr. et al. | |
| 6,564,697 B2 | 5/2003 | Maxwell et al. | |
| 6,622,614 B1 | 9/2003 | Smith | |
| 6,685,059 B2 | 2/2004 | Jones et al. | |
| 6,713,109 B1 | 3/2004 | Lassota | |
| 6,722,265 B2 | 4/2004 | Priley | |
| 6,726,946 B1 | 4/2004 | Smith | |
| 6,739,240 B2 | 5/2004 | De Koning et al. | |
| 6,792,847 B2 | 9/2004 | Tobin et al. | |
| 6,807,898 B2 | 10/2004 | De Koning et al. | |
| 6,883,685 B2 | 4/2005 | Jones et al. | |
| 6,887,506 B2 | 5/2005 | Kalenian | |
| 6,981,441 B1 | 1/2006 | Dussinger | |
| 6,988,641 B2 | 1/2006 | Jones et al. | |
| 7,021,197 B2 | 4/2006 | Chen et al. | |
| 7,047,870 B2 | 5/2006 | Gantt et al. | |
| 7,383,966 B2 | 6/2008 | Ziesel | |
| 7,487,887 B2 | 2/2009 | Ziesel | |
| 7,578,415 B2 | 8/2009 | Ziesel | |
| 2001/0052294 A1 | 12/2001 | Schmed | |
| 2002/0059870 A1 | 5/2002 | Walters Jr. et al. | |
| 2002/0145008 A1 * | 10/2002 | Jones et al. | 222/146.5 |
| 2003/0145736 A1 | 8/2003 | Green | |
| 2004/0056046 A1 | 3/2004 | Jones et al. | |
| 2004/0255790 A1 | 12/2004 | Green | |
| 2005/0095158 A1 | 5/2005 | Green et al. | |
| 2005/0279215 A1 | 12/2005 | Cai | |
| 2006/0172056 A1 | 8/2006 | Tobin et al. | |
| 2007/0242561 A1 * | 10/2007 | Agon et al. | 366/279 |
| 2008/0063772 A1 | 3/2008 | Kirschner et al. | |
| 2009/0032609 A1 | 2/2009 | Ziesel | |

FOREIGN PATENT DOCUMENTS

| | | |
|---|---|---|
| EP | 0 780 310 A1 | 10/1995 |
| EP | 0 780 307 A1 | 10/1996 |
| EP | 0 780 370 A3 | 10/1996 |
| EP | 1 042 978 A1 | 4/2000 |
| FR | 2 617 389 A1 | 6/1987 |
| GB | 2059753 | 4/1981 |
| JP | 2004/187503 | 7/2004 |
| JP | 2004/246616 | 9/2004 |
| NL | 1021399 C6 | 3/2004 |
| WO | 93/17932 | 3/1992 |
| WO | 98/23196 | 6/1998 |
| WO | 01/60220 A1 | 2/2001 |
| WO | 01/60712 A1 | 2/2001 |
| WO | 02/087350 A1 | 11/2002 |
| WO | 03065859 | 8/2003 |
| WO | 2005/041729 | 5/2005 |
| WO | WO 2007060694 A1 * | 5/2007 |

OTHER PUBLICATIONS

J.M. De Jong Duke; Title: ManualFor Machines With CoEx—Brewer and MoVeC 200 Controller; Rev. L, Ref.: 5DTC020_Ray_ideon_delphi; 2000, pp. 1-120.

* cited by examiner

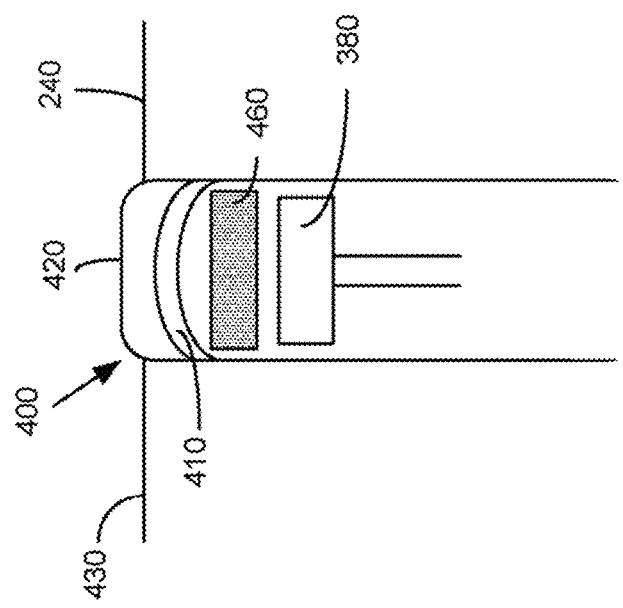
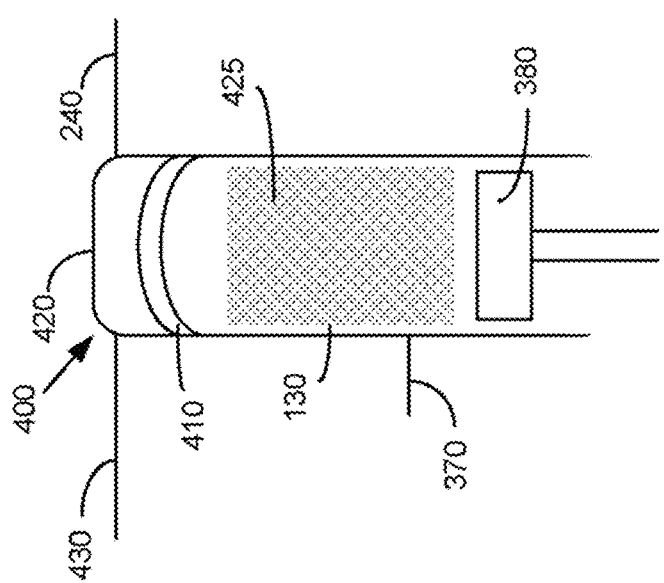
FIG. 4B
FIG. 4A

SYSTEMS AND METHODS FOR ON DEMAND ICED TEA

RELATED APPLICATIONS

The present application is a continuation-in-part of U.S. patent application Ser. No. 12/188,250, entitled "Systems and Methods for On Demand Iced Tea", filed on Aug. 8, 2008, currently pending, and incorporated by reference herein in full.

TECHNICAL FIELD

The present application relates generally to systems and methods for brewing tea and more particularly relates to systems and methods for brewing highly concentrated tea and then quickly diluting the concentrated tea so as to provide iced tea on demand.

BACKGROUND OF THE INVENTION

Numerous methods are known for providing tea and other types of steeped beverages. These methods range from the use of traditional teabags to the use of tea extracts and concentrates. The traditional teabag can provide a high quality cup of tea but the teabag generally is not well suited for providing larger volumes of tea, at least not within a small amount of time. Tea extracts and concentrates may quickly provide larger volumes of tea and also may have an extended shelf life. The quality of the tea produced from such extracts and concentrates, however, often is not as high as the quality of the tea made from traditional teabags.

Further issues may be involved in the brewing of tea intended to be served as iced tea. After brewing, the tea generally must be cooled to at least room temperature before adding ice or the ice may melt and dilute the tea. Further, sweeteners and flavoring often are added to the tea. These additives, however, generally must be measured and mixed in by hand. The preparation of iced tea thus may be a somewhat labor and time intensive process.

There is a desire, therefore, for improved systems and methods of brewing high quality iced tea in larger volumes but in smaller amounts of time than may be possible with the use of traditional teabags. The systems and methods described herein preferably should produce a high quality and a high volume of iced tea in an efficient and cost effective manner.

SUMMARY OF THE INVENTION

The present application thus provides a beverage brewing system for producing on demand iced tea. The beverage brewing system may include a concentrated beverage brewer, one or more brew water circuits in communication with the concentrated beverage brewer, one or more makeup water circuits, and one or more back pressure valves in communication with the brew water circuits and the makeup water circuits.

The beverage brewing system further may include a mixing nozzle downstream of the concentrated beverage brewer. A first makeup water circuit may be in communication with the concentrated beverage brewer and a second makeup water circuit may be in communication with the mixing nozzle. One or more additive circuits with the back pressure valves thereon may be in communication with the mixing nozzle. The additive circuits may include one or more sweetener circuits and one or more flavoring circuits. Each of the back pressure valves may include a piston and a plurality of outlet ports. A regulator valve may be in communication with the brew water circuits and the makeup water circuits. Each of the back pressure valves may have a predetermined flow rate therethrough.

The beverage brewing system further may include a removable dispensing urn. A load cell may be associated with the removable dispensing urn. The beverage brewing system further may include a selection display. A controller may be in communication with the concentrated beverage brewer and the back pressure valves.

The beverage brewing system further may include a number of mixing nozzles downstream of the concentrated beverage brewer and in communication with the makeup water circuits. A number of dispensing urns may be positioned downstream of the mixing nozzles. The beverage brewing system also may include a moveable mixing nozzle downstream of the concentrated beverage brewer and in communication with the makeup water circuits. A number of dispensing urns may be positioned downstream of the moveable nozzle.

The present application further may provide a method of dispensing a diluted beverage. The method may include the steps of flowing a predetermined flow rate of brew water to a brewer from a water source via a first back pressure valve, brewing a concentrated beverage in the brewer, flowing the concentrated beverage to a mixing nozzle, flowing a predetermined flow rate of makeup water to the mixing nozzle from the water source via a second back pressure valve, and mixing the concentrated beverage and the makeup water to form the diluted beverage. The flowing steps may include regulating the water source for a constant pressure. The method may further include the step of flowing a predetermined flow rate of an additive to the mixing nozzle from a third back pressure valve.

The present application further provides for a low pressure brewing system. The low pressure brewing system may include a concentrated beverage brewer, one or more brew water circuits in communication with the concentrated beverage brewer, one or more makeup water circuits, one or more additive circuits, a number of back pressure valves in communication with the brew water circuits, the makeup water circuits, and the additive circuits, and a mixing nozzle in communication with the concentrated beverage brewer, the makeup water circuits, and the additive circuits.

A first makeup water circuit may be in communication with the concentrated beverage brewer and a second makeup water circuit may be in communication with the mixing nozzle. A regulator valve may be in communication with the brew water circuits and the makeup water circuits. Each of the back pressure valves may include a predetermined flow rate therethrough. The low pressure brewing system further may include a removable dispensing urn with a load cell associated therewith.

The present application further provides for a beverage brewing system. The beverage brewing system may include a brewer for brewing a concentrated beverage, a number of mixing nozzles in communication with the brewer, and a number of makeup water lines in communication with the mixing nozzles so as to provide makeup water to the concentrated beverage.

The present application further provides for a beverage brewing system. The beverage brewing system may include a brewer for brewing a concentrated beverage, a moveable mixing nozzle in communication with the brewer, a makeup water line in communication with the moveable nozzle so as to provide make up water to the concentrated beverage, and a number of dispensing urns in communication with the moveable mixing nozzle.

These and other features and improvements of the present application will become apparent to one of ordinary skill in the art upon review of the following detailed description when taken in conjunction with the several drawings and the appended claims.

BRIEF DESCRIPTION OF THE DRAWINGS

FIG. 4A is a side cross-sectional view of the brewing chamber of the tea brewer of FIG. 3 shown with a piston in a retracted position.

FIG. 4B is a side cross-sectional view of the brewing chamber of the tea brewer of FIG. 3 with the piston an extended position.

DETAILED DESCRIPTION

Figure 1:
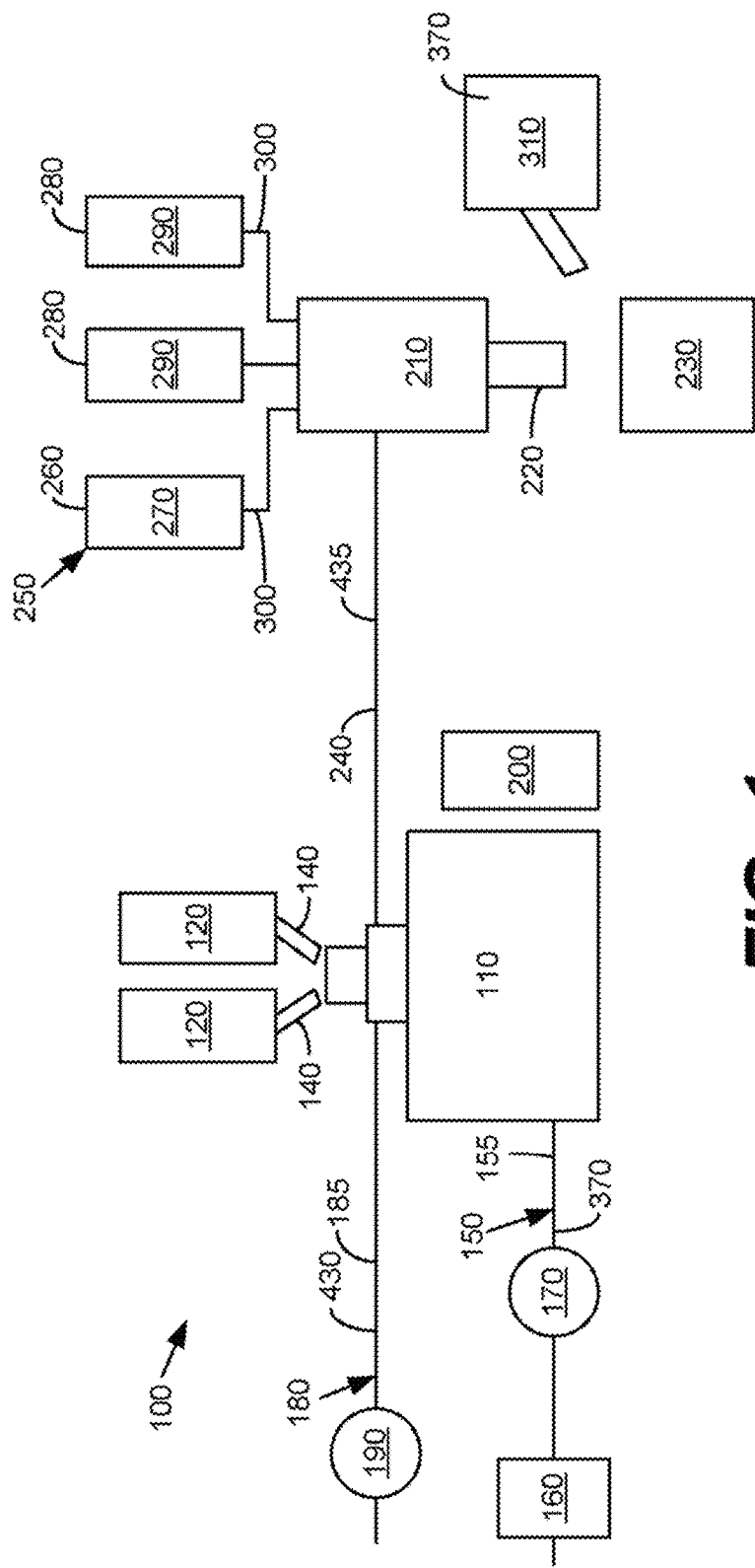
FIG. 1 is a schematic view of an iced tea brewing system as is described herein.

Referring now to the drawings, in which like numbers refer to like elements throughout the several views, FIG. 1 shows an iced tea brewing system 100 as is described herein. The iced tea brewing system 100 includes a tea brewer 110. As will be described in more detail below, the tea brewer 100 may be a brewing device sold by de Jong Duke of Sliedrecht, Netherlands, under the trademark "COEX®". Similar types of brewing devices may be used herein.

The iced tea brewing system 100 further includes one or more tea sources 120. Any number of tea sources 120 may be used. The tea sources 120 generally may hold loose, bulk tea leaves 130. The tea leaves 130 may include black teas, green teas, white teas, oolong teas, combinations, or any type processed leaves, herbal teas, or similar materials. The tea sources 120 may have any desired volume or shape. A dose of the tea leaves 130 may be fed to the tea brewer 100 via one or more tea chutes 140 in communication with the tea sources 120 or via other types of feeding mechanisms.

The iced tea brewing system 100 also may include a hot water source 150 with hot water 155 therein in communication with the tea brewer 110. The hot water source 150 may include a conventional water source in communication with a boiler 160. The boiler 160 may any type of conventional water heating device that can bring the water to a boil or close thereto. The hot water source 150 also may include a hot water pump 170 in communication with the boiler 160. The hot water pump 170 may be of conventional design.

The iced tea brewing system 100 further may include a makeup water source 180 with cool makeup water 185 or other type of diluent therein in communication with the tea brewer 110. The makeup water source 180 may be in communication with a conventional water supply and the tea brewer 110 via a makeup water pump 190. The makeup water pump 190 may be of conventional design and may be similar to the hot water pump 170 described above.

The iced tea brewing system 110 further may include a spent tea receptacle 200. The spent tea receptacle 200 may be positioned adjacent to the tea brewer 110. The spent tea receptacle 200 may accept the spent tea leaves 130 from the tea brewer.

The iced tea brewing system 100 also may include a dispensing nozzle 210. The dispensing nozzle 210 may be similar to that shown in commonly owned U.S. Pat. No. 7,383,966 to Ziesel, entitled "Dispensing Nozzle"; U.S. Pat. No. 7,487,887 to Ziesel, entitled "Dispensing Nozzle"; U.S. Pat. No. 7,578,415 to Ziesel, entitled "Dispensing Nozzle Assembly"; and/or U.S. Patent Publication No. 2009/0032609 to Ziesel, entitled "Dispensing Nozzle Assembly." Dilution of the sweetener may be accomplished as described in U.S. Patent Publication No. 2009/0032609 or in U.S. Ser. No. 12/251,469 to Ziesel, entitled "Systems and Methods for Predilution of Sweetener." U.S. Pat. No. 7,383,966; U.S. Pat. No. 7,487,887; U.S. Pat. No. 7,578,415; U.S. Patent Publication No. 2009/0032609; and U.S. Ser. No. 12/251,469 are incorporated herein by reference in their entirety. Similar types of nozzles and dilution techniques may be used herein.

In this example, the dispensing nozzle 210 may include a central elongated target 220 so as to mix the various fluids herein and direct the mixed fluid stream towards a container 230. Other types of mixing devices may be used herein. The container 230 may be a single serving sized cup or the container 230 may take the form of a pitcher, an urn, or other type of receptacle for larger volumes of tea. The dispensing nozzle 210 may be in communication with the tea brewer 110 via a brewed tea line 240.

The iced tea brewing system 100 also may include a number of additive sources 250. The additive sources 250 may include one or more sweetener sources 260. The sweetener sources 260 may include one or more sweeteners 270 therein. The sweeteners 270 may be natural or artificial sweetener. The sweeteners 270 may include sucrose, high fructose corn syrup, and/or other types of conventional sweeteners. The additive sources 250 also may include a number of flavoring sources 280. The flavoring sources 280 may include one or more flavorings 290 therein. The flavorings 290 may be juice concentrates, syrups, or similar types of materials. For example, the flavoring 290 may include lemon, peach, or any other type of fruit or other flavorings. The additive sources 250 also may include natural or artificial colors; additives for controlling tartness, e.g., citric acid or potassium citrate; functional additives such as vitamins, minerals, herbal extracts, nutraceuticals, and over the counter (or otherwise) medicines such as acetaminophen; and/or any other desired type of materials. The additive sources 250 may be in communication with the dispensing nozzle 210 via one or more additive lines 300. Any number of additive lines 300 may be used.

The iced tea brewing system 100 also may include an ice dispenser 310. The ice dispenser 310 may be positioned about the dispensing nozzle 210 or otherwise so as to provide ice 320 to the container 230 or otherwise. Alternatively, the ice dispenser 310 may be remote from the iced tea brewing system 100. Various types of refrigeration means also may be used herein.

Figure 2:
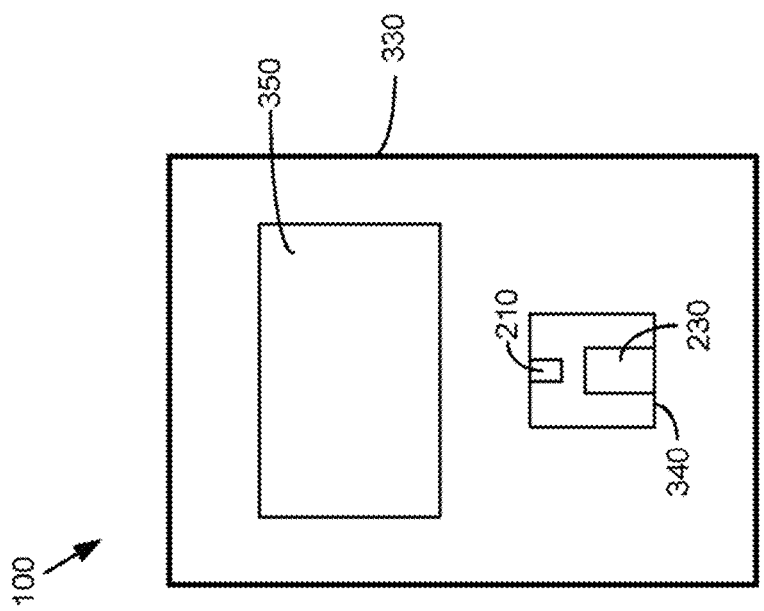
FIG. 2 is a side plan view of the exterior of the iced tea brewing system of FIG. 1.

As is shown in FIG. 2, the components of the iced tea brewing system 100 described above may be positioned within an enclosure 330. The enclosure 330 may include a support 340 for the container 230 to rest thereon while being filled with a beverage via the dispensing nozzle 210. The enclosure 330 of the iced tea brewing system 100 also may include a display 350 positioned thereon. The display 350 may be any type of selection device in which a consumer may select a beverage. These selections may include black or green tea leaves 130 from the tea sources 120 and various types of additives such as the sweeteners 270, the flavorings 290, and the like from the additive sources 250. The addition of ice 320 from the ice dispenser 310 also may be selected. Any other type of selection means may be used herein. The display 350 may be interactive. The display 350 and the iced tea brewing system 100 as a whole may be networked so as to provide communications concerning diagnostics, dispensing volume, payment, resupply, selection changes, and the like.

Figure 3:
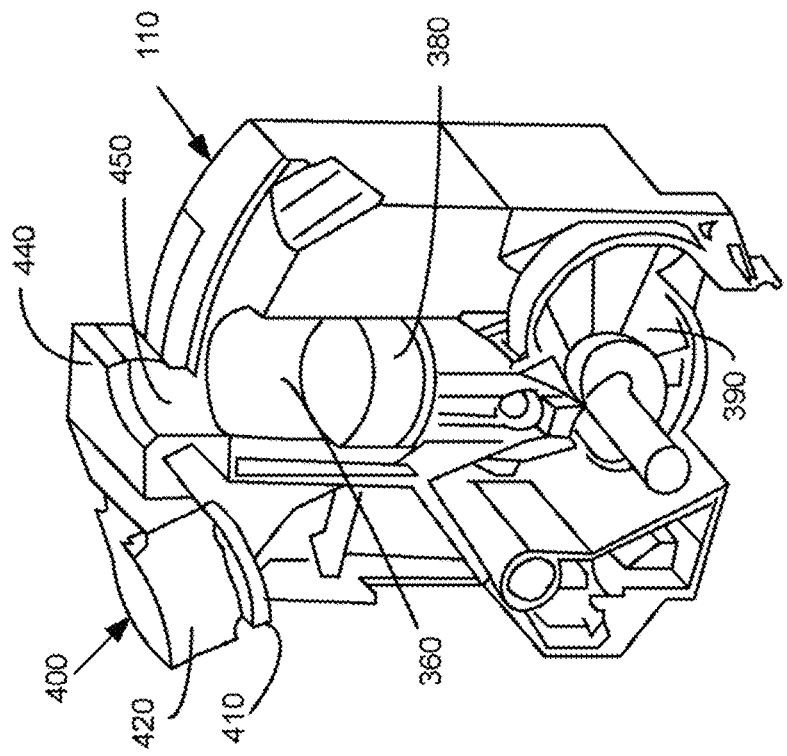
FIG. 3 is a side cross-sectional view of a tea brewer as may be used with the iced tea brewing system of FIG. 1.

FIGS. 3, 4A, and 4B show the tea brewer 110 in more detail. The tea brewer 110 may include an internal brewing chamber 360. The internal brewing chamber 360 is in communication with the hot water source 150 via a hot water line 370. The internal chamber 360 may include a piston 380 positioned therein. The piston 380 may be of conventional design. The piston 380 forms a largely water tight seal within the internal brewing chamber 360. The piston 380 may move up and down within the internal brewing chamber 360 as driven by an eccentric earn 390. Other types of drive mechanisms may be used herein.

The internal brewing chamber 360 of the tea brewer 110 may be enclosed by an upper cap 400. The upper cap 400 may be maneuverable into an open and shut position by the eccentric cam 390 or via other types of drive mechanisms. The upper cap 400 may include a filter 410. The filter 410 may be a metallic filter that is sized to let the brewed tea pass therethrough under pressure but maintain the tea leaves 130 therein. The upper cap 400 also may include a mixing area 420. The mixing area 420 allows for mixing an amount of concentrated, brewed tea 425 with the makeup water 185 from the makeup water system 180 via a makeup water line 430. An amount of the diluted tea 435 then may be forwarded to the dispensing nozzle 210 via the brewed tea line 340. The mixing area 420 also may be remote from the internal brewing chamber 360. The mixing area 420 may be simply a three way valve connecting the makeup water line 430, the internal brewing chamber 360, and the brewed tea line 240 or the mixing area 420 may include a chamber connecting each of these elements.

The upper cap 400 also may include a blunt edge 440 on one side thereof. The blunt edge 440 serves to knock the spent tea leaves 130 into the spent tea receptacle 200. Other types of discard mechanisms may be used herein. The upper cap 400 also may include a nozzle 450 for accepting the tea leaves 230 from the tea sources 120. Other types of in-flow mechanisms also may be used herein.

In use, a consumer may select an iced tea beverage via the display 350. For example, the consumer may select black tea and then select additives such as a sweetener 270, a flavoring 290, and ice 320. The iced tea brewing system 100 then may release a dose of tea leaves 130 from one of the tea sources 120 into the nozzle 450 of the tea brewer 110. The tea leaves 130 may fall into the internal brewing chamber 360 of the tea brewer 110. Note that paper filters, bags, or other types of paper sources may not be needed within the internal brewing chamber 360.

As is shown in FIG. 4A, once the tea leaves 130 are positioned within the internal brewing chamber 360, the upper cap 400 of the tea brewer 110 closes the internal brewing chamber 360. Hot water 155 from the hot water source 150 then flows into the internal brewing chamber 360 via the hot water line 370 first to provide a preinfusion dose of the hot water 155 and then to brew the concentrated tea 425. The hot water 155 preferably is at about 98° Celsius (about 208° Fahrenheit). Other temperatures may be used herein, preferably between about 90° Celsius to about 100° Celsius (about 194° Fahrenheit to about 212° Fahrenheit). The tea leaves 130 may take about 20 to about 30 seconds to brew, with about 23 to about 25 being preferred. Other brewing times may be used herein. The brewing pressure also may vary.

As the brewing cycle ends, the piston 380 extends within the internal brewing chamber 360 as is shown in FIG. 4B. This upward movement forces the brewed concentrated tea 425 through the filter 410 and into the mixing area 420. The brewed concentrated tea 425 may have a concentration of about 6.75 to 1. Any concentration greater than about 4:1 and less than about 8:1 may be used herein. The brewed concentrated tea 425 then may be mixed with the makeup water 185 from the makeup water system 180 via the makeup water line 430. The brewed concentrated tea 425 thus is diluted into the diluted tea 435 and may be forwarded to the dispensing nozzle 210 via the brewed tea line 240.

The piston 380 then may continue to extend within the internal brewing chamber 360. In further extending, the piston 380 compacts the tea leaves 130 into a puck-like structure 460. The compression also squeezes the tea leaves 130 such that an additional amount of the brewed concentrated tea 425 (with the brewed tea solids therein) is forced through the filter 410 and into the mixing area 420. This final squeezing step appears to provide a higher quality tea beverage perhaps with more tea solids and other types of tea components than can be provided without compression. The squeezed amount appears to be the mostly highly concentrated part of the brewed concentrated tea 425. By way of example, if about 100 milliliters of brewed concentrated tea 425 pass into the mixing area 420 via the piston 380, this final squeezing step may add about an extra 15 milliliters or so. (This squeezed amount generally is discarded when brewing coffee as being too bitter for consumption.) The total of about 115 milliliters of brewed concentrated tea 425 is then mixed with about 775 milliliters of makeup water for the concentration of about 6.75 to 1.

The piston 380 then may retract somewhat while the upper cap 400 opens the internal brewing chamber 360. The piston 380 then extends again so as to raise the puck 460 out of the internal brewing chamber 360. The upper cap 400 again pivots such that the blunt edge 440 knocks the puck 460 into the spent tea receptacle 200. The iced tea brewing system 100 thus generates no waste other than the spent tea leaves 130 in the form of the puck 460.

As described above, the diluted tea 435 passes through the dispensing nozzle 210 via the brewed tea line 240. The makeup water system 180 continues flowing the makeup water 185 through the mixing area 420 of the upper cap 400 and into the brewed tea line 240 for an amount of time after the squeezing step is completed so as to clear the mixing area 420 and the brewed tea line 240 of any remaining tea. The diluted tea 435 passes through the dispensing nozzle 210 and passes along the elongated target 220 towards the container 230. The iced tea brewing system 100 also mixes in the selected additives at this time. For example, a sweetener 270 from the sweetener source 260 mixes with the diluted tea 435 along the elongated target 220. Likewise, the selected flavorings 290 from the flavoring sources 280 also mix along the elongated target 220 and fall towards the container 230. Finally, the iced tea brewing system 100 also may include an amount of ice 320 from the ice dispenser 310 if desired.

The iced tea brewing system 100 thus can make any desired volume of iced tea on demand in a fast and efficient manner. Because the dilution ratio of the concentrated brewed tea 425 to the makeup water 185 is relatively high, the makeup water 185 brings the concentrated brew tea 425 to a lower temperature such that ice can be added immediately to the diluted tea 435 without causing the ice to melt prematurely. Likewise, the iced tea brewing system 100 automatically adds and mixes additives such as the sweeteners 270 and the flavorings 290 to the container 230 in the correct proportions. Further, the iced tea brewing system 100 has no waste other than the spent tea leaves 130. The systems and methods described herein thus provide high volumes of fresh brewed ice tea in a fast and efficient manner. For example, more than a liter of iced tea may be brewed in less than about one (1) minute or so.

Figure 5:
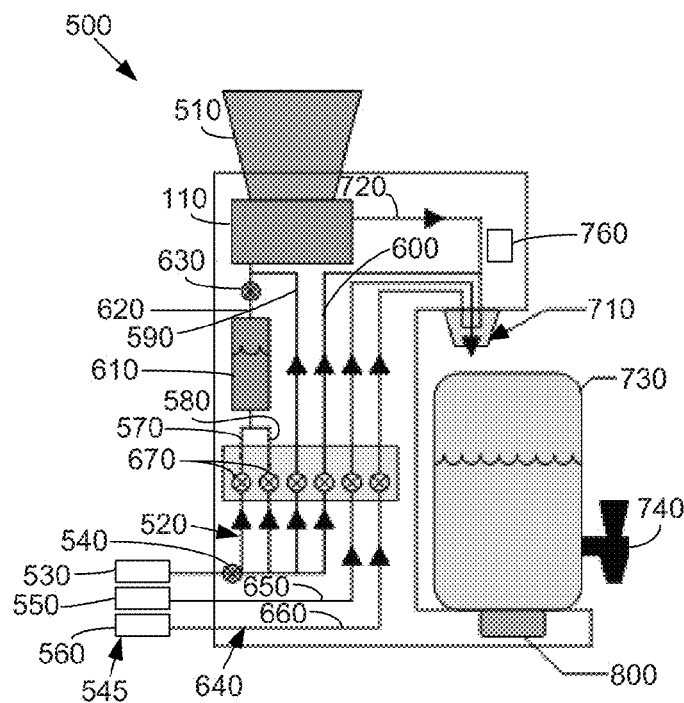
FIG. 5 is a schematic view of the low pressure brewing system as is described herein.

FIG. 5 shows a low pressure tea brewing system 500 as is described herein. The low pressure tea brewing system 500 may include the tea brewer 110 as is described above. Specifically, the tea brewer 110 may be provided by de Jong Duke under the trademark "COEX®". Similar types of brewing devices may be used herein. The tea brewer 110 may be in communication with a dry feed hopper 510. The dry feed hopper 510 may be similar to the tea sources 120 described above with the loose bulk tea leaves 130 and the like therein. The dry feed hopper 510 may provide a dose of the tea leaves 130 to the tea brewer 110 via an auger or other type of dosing mechanism.

The low pressure tea brewing system 500 may include a number of fluid circuits 520 therein. Any number of fluid circuits 520 may be used herein. One or more of the fluid circuits 520 may be in communication with an ambient water source 530. The ambient water source 530 may be any type of conventional water supply. One or more of the fluid circuits 520 may be in communication with the ambient water source 530 via a regulator valve 540. The regulator valve 540 may be of conventional design. The regulator valve 540 may ensure a relatively constant incoming water pressure to the fluid circuits 520.

The fluid circuits 520 further may be in communication with one or more additive sources 545. The additive sources 250 may include one or sweetener sources 550 and one or more flavor sources 560. The sweetener sources 550 may include any type of natural or artificial sweeteners such as sugar, high fructose corn syrup, and the like. As above, the sweetener sources 550 may include the sweeteners 270 therein. Likewise, the flavor sources 560 may include the flavorings 290 as described above such as lemon, peach, or any other type of fruit or flavoring. Any other type of additive source 545 may be used herein with any type of flowable additive and the like.

In the example of FIG. 5, the fluid circuits 520 include four (4) water circuits, a first brew water circuit 570, a second brew water circuit 580, a first makeup water circuit 590, and a second makeup water circuit 600. The first and second brew water circuits 570, 580 may be in communication with a boiler 610. The boiler 610 may be similar to the boiler 160 described above and may be any type of conventional water heating device. The first and second brew water circuits 570, 580 may merge within or about the boiler 610. A hot water line 620 may connect the boiler 610 with the tea brewer 110.

The tea brewer 110 may have an inlet valve 630 positioned therein or on the hot water line 620. The first makeup water circuit 590 likewise may be in communication with the tea brewer 110 and/or the hot water line 620 downstream of the boiler 610. The first make up water circuit 590 provides makeup water at an ambient temperature to the tea brewer 110. The second makeup water circuit 600 may be in communication with a mixing nozzle as will be described in more detail below to provide additional makeup water at an ambient temperature thereto. Although four water circuits 570-600 are described herein, any number of water circuits may be used. We use the term "water circuit" to include the use of any type of diluent.

The fluid circuits 520 also include one or more additive circuits 640. The additive circuits 640 may include one or more sweetener circuits 650 in communication with the sweetener sources 550 and one or more flavor circuits 660 in communication with the flavor sources 560. Any number of additive circuits 640 may be used herein with any type of additives. The additive circuits 640 may be in communication with the mixing nozzle as will be described in more detail below.

Each of the fluid circuits 520 may include a flow controller 670 thereon. The flow controllers 670 may be solenoid operated valves and the like. Moreover, each of the flow controllers 670 may be sized for a specific flow rate. In other words, the flow controller 670 on the first brew water circuit 570 may be sized for a flow rate of about two milliliters per second while the flow controller 670 on the second brew circuit 580 may be sized for a flow rate of about three milliliters per second. Any flow rate may be used herein. Moreover, both brew water circuits 570, 580 may be used at the same time if a flow rate of about five milliliters per second flow rate is desired.

Figure 6:
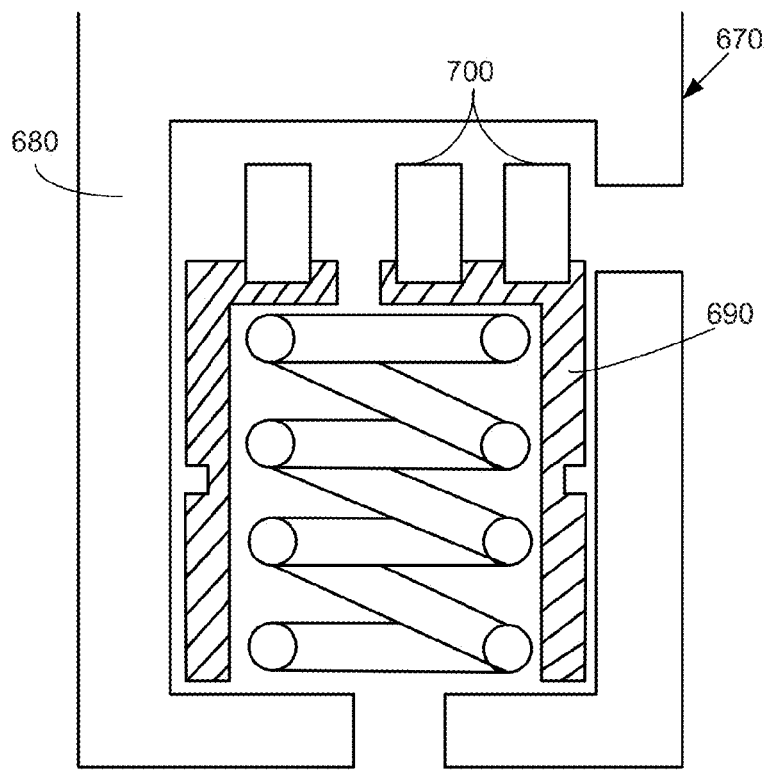
FIG. 6 is a side cross-sectional view of a back pressure device as is described herein.

The flow controllers 670 also may function as a back pressure control device 680. Because of the use of the regulator valve 540, the pressure in each of the fluid circuits 520 may be relatively constant. Due to the nature of the tea brewing process, however, the back pressure developed within the tea brewer 110 and in the fluid circuits 520 may vary as the tea leaves 130 therein swell and expand. As is shown in FIG. 6, the back pressure control device 680 may include an internal piston 690 with a number of outlet ports 700. Back pressure causes the outlet ports 700 to open so as to maintain the relatively consistent flow rate therethrough. The relatively constant pressure from the regulator valve 540 may be about twenty (20) to about thirty (30) pounds per square inch while the back pressure may vary from about zero (0) to about eighteen (18) pounds per square inch or higher. These pressures may vary.

The combination of the water regulator 540 and the flow controllers 670 thus largely eliminates the need for the pumps 170, 190 described above. This combination therefore provides the "low pressure" nature of the low pressure brewing system 500 described herein although other pressures and pressure ranges may be accommodated. The low pressure brewing system 500 also is safer as compared to conventional high pressure brewing devices.

The tea brewer 110 and a number of the fluid circuits 520 may be in communication with a mixing nozzle 710. The tea brewer 110 may be in communication with the mixing nozzle 710 via a concentrated tea line 720. One of the mixing nozzles described above may be used herein such as that described in U.S. Patent Publication No. 2009/0032609 to Ziesel or otherwise. The brewed concentrated tea 425 may be mixed with the makeup water 185 and various types of additives such as the sweeteners 270 and the flavorings 290. The mixing nozzle 710 may be in communication with the container 230. In this example, the container 230 may be in the form of a dispensing urn 730 as will be described in more detail below. The dispensing urn 730 may take any convenient shape and size. The dispensing urn 730 may have a conventional dispensing valve 740 positioned thereon. The dispensing urn 730 is removable from the low pressure tea brewing system 500. Multiple dispensing urns may be used herein.

Figure 7:
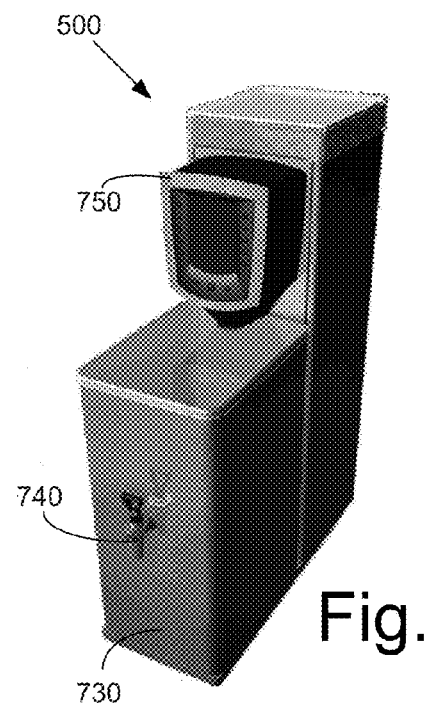
FIG. 7 is a perspective view of the exterior of the low pressure brewing system of FIG. 5.

As is shown in FIG. 7, the low pressure tea brewing system 500 further may include a display 750 positioned thereon similar to the display 350 described above. The display 750 may be any type of communication/selection device in which a consumer may select a beverage. The selections may be the type of tea, the type of additives, the size of the beverage, the addition of ice, etc. In this example, the display 750 may take the form of a conventional brew basket and the like. Any shape, however, may be used herein.

The low pressure tea brewing system 500 may include a controller 760. The controller 760 may be a conventional programmable microprocessor and the like. The controller 760 may be in communication with the display 750, the tea brewer 110, the flow controllers 670, and the other component herein so as to provide specific beverages as will be described in more detail below. The controller 760 and the low pressure tea brewing system 500 as a whole may be networked so as to provide communications concerning diagnostics, dispensing volume, payment, resupply, selection changes, and the like.

Figure 8:
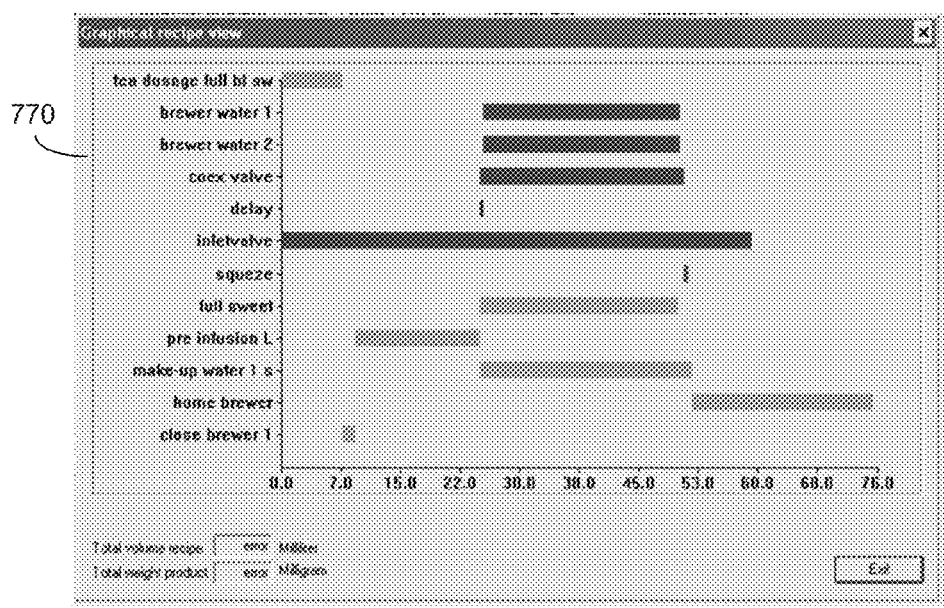
FIG. 8 is a graphical view of a recipe as may be executed by the low pressure brewing system of FIG. 5.

Specifically, the controller 760 may be programmed with a number of "recipes" 770. The recipes 770 determine the operation of the components of the low pressure tea brewing system 500 in terms of the type and size of beverage, brewing pressure, brewing time, and other parameters so as to create many different types of beverages. For example, FIG. 8 shows one such recipe 770. As described above, the user thus selects the type of beverage, i.e., black or green tea, the size of the beverage, i.e., a glass, pitcher, or gallon, sweetness, and flavors. The controller 760 then selects the appropriate recipe 770.

In this example, the controller 760 instructs the feed hopper 510 and the tea brewer 110 to place a dose of tea leaves 130 within the internal brewing chamber 360 and opens the inlet valve 630 to the tea brewer 110. At about 7.0 seconds, the controller 760 instructs the upper cap 400 of the tea brewer 110 to close. The piston 380 may be positioned within the brewing chamber 360 for the selected volume. Once the tea brewer 110 is closed, an amount of preinfusion water is delivered from the first makeup water circuit 590 or otherwise so as to soak the tea leaves 130 within the internal brewing chamber 360. After a predetermined amount of time, the first and second brew water circuits 570, 580 are opened and deliver water to the boiler 610 such that brewing begins and concentrated tea 425 begins flowing to the mixing nozzle 710. The predetermined amount of time may be about twenty (20) to forty-five (45) seconds. The makeup water circuits 590, 600 and the additive circuits 640 also may be opened. The operation of the brew water circuits 570, 580 and the makeup water circuits 590, 600 may be staggered or pulsed. The additive circuits 640 also may be staggered or pulsed so as to prevent stratification and to provide ample time for dilution. As the tea leaves 130 swell during the brewing process and create an increasing back pressure therein, the flow controllers 670 maintain a constant flow rate therethrough. As described above, the flow controllers 670 are sized for the desired flow rate therethrough such that pumping devices and the like may not be required.

After the brew water circuits 570, 580 stop after another predetermined amount of time of about forty (40) to sixty (60) seconds, the piston 380 of the tea brewer 110 may squeeze the tea leaves 130 as described above. The makeup water circuits 590, 600 may continue somewhat thereafter until about 53 seconds so as to flush the tea brewer 110 and prevent carryover. The concentrated brewed tea 425, the makeup water 185, the sweeteners 270, and the flavorings 290 may mix within and downstream of the nozzle 710 and into the container 230. The tea brewer 110 then may eject the puck 460 from the tea brewer 110.

The timing of each step may vary as desired. The timing described above is for the purpose of example only. Likewise, the amount of water, tea leaves, and additives may vary as desired. The recipe 770 also may take into consideration whether ice 325 is to be added directly to the beverage or not, i.e., ice can be considered part of the makeup water volume if desired. Several of the additives may also require dilution. The lower pressure tea brewing system 500 thus may provide any number of tea beverages in a fast and efficient manner. Because the controller 760 can vary the brew conditions therein, the low pressure tea brewing system 500 may provide a consistent beverage over multiple cycles.

Figure 9:
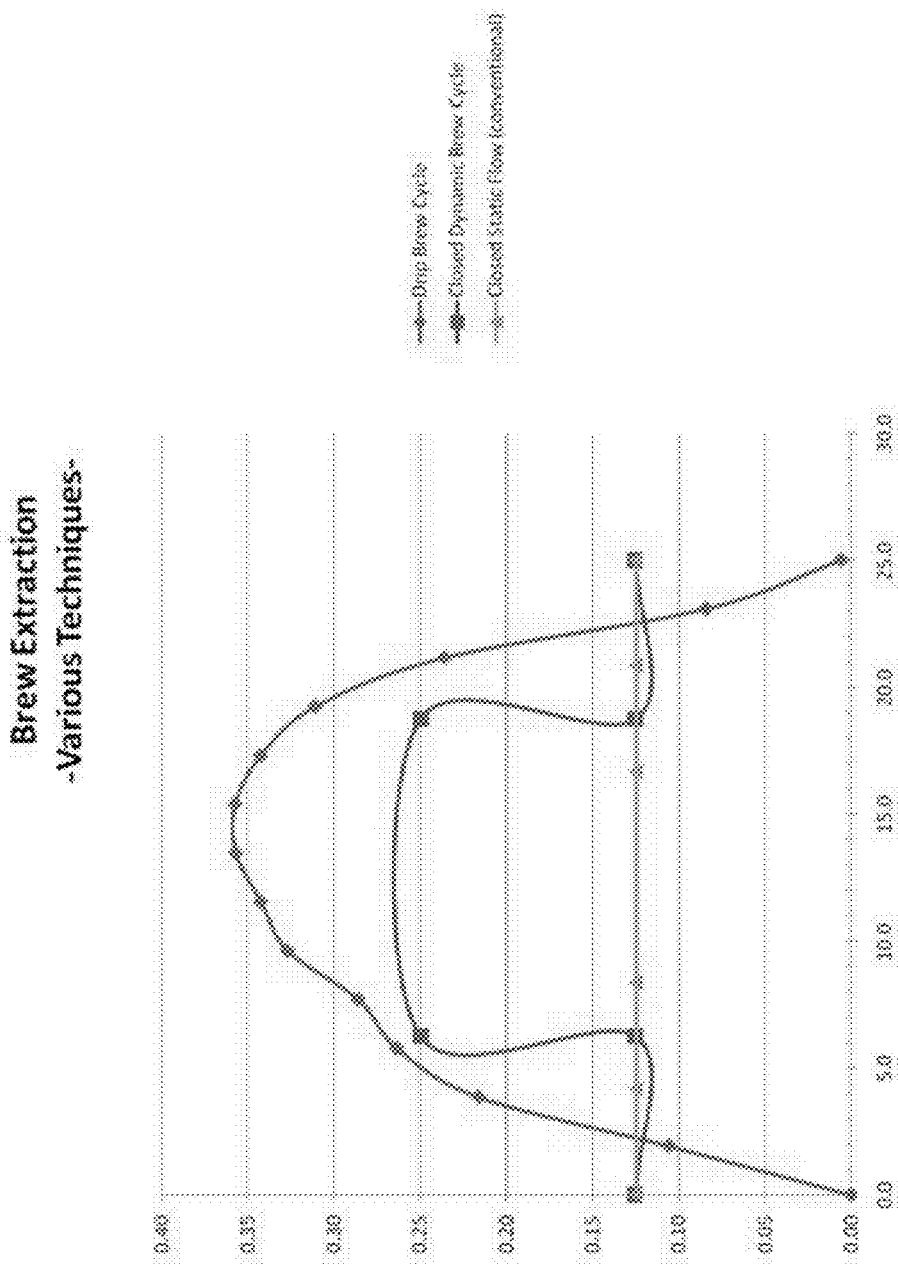
FIG. 9 is a chart showing varying brew extraction techniques.

In fact, the low pressure tea brewing system 500 may provide a beverage profile similar to that of traditional drip brewed teas in terms of flavor, color, strength, and overall profile while promoting greater tea yield with less overall waste. As opposed to high pressure static flow devices with a constant flow rate therethrough, the low pressure tea brewing system 500 provides tea extraction that largely mimics a drip brew cycle. As is shown in FIG. 9, the tea extraction of the low pressure brewing system 500 has a similar parabolic curve to that of drip brew tea with the associated color and tea solids production. The constant pressure within the tea brewer 110 results in the flatter top of the curve, but also provides a more consistent beverage. The low pressure brewing system 500 thus may vary the brewing parameters so as to match any desired taste profile.

Referring again to FIG. 5, the low pressure tea brewing system 500 also may include a load cell 800 in communication with the controller 760. The load cell 800 may be any type of conventional weighing device. The load cell 800 may be positioned beneath the container 230, the dispensing urn 730, or otherwise. The load cell 800 thus can monitor the volume of the diluted tea 435 that may be therein and provide feedback to the controller 760. For example, it may take a number of cycles to fill the dispensing urn 730. The load cell 800 thus can determine when the dispensing urn 730 is full or reached a desired volume.

The load cell 800 and the controller 760 also may instruct the low pressure tea brewing system 500 to refill the dispensing urn 730 when appropriate such that the low pressure tea brewing system 500 may be largely self-managing. The controller 760 also may prevent operation of the low pressuring brewing system 500 during periods of low demand and otherwise so as to signal a sanitation cycle. The dispensing urns 730 are independent of the low pressure tea brewing system 500. The dispensing urns 730 thus may be removed therefrom and deployed in a conventional manner.

Figure 10:
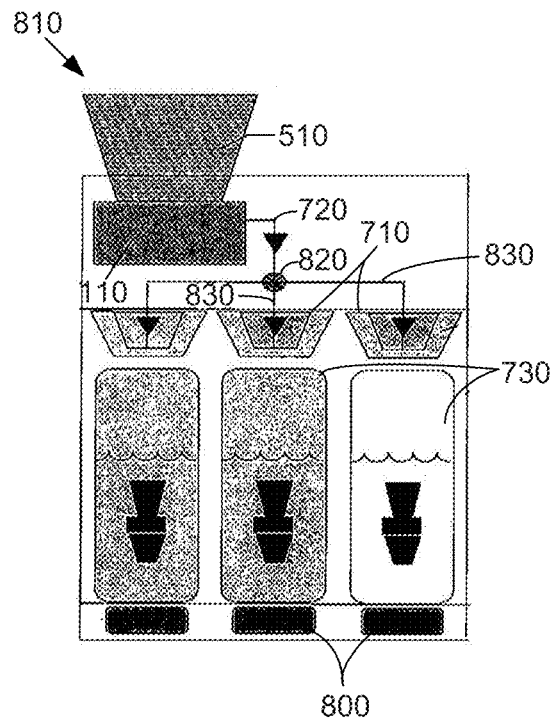
FIG. 10 is a schematic view of an alternative embodiment of the low pressure tea brewing system with multiple mixing nozzles.

FIG. 10 shows an alternative embodiment of the low pressure tea brewing system 810. In this embodiment, multiple dispensing urns 730 may be used herein. As a result, multiple mixing nozzles 710 also may be used. Specifically, the tea concentrate line 720 may include an urn valve 820 thereon. The urn valve 820 may be in communication with the mixing nozzles 710 via a number of nozzle lines 830. The urn valve 820 may direct a flow of the brewed concentrated tea 425 to the desired mixing nozzle 710. A number of the fluid circuits 520 may be in communication with each mixing nozzle 710 so as to provide the makeup water and additives as desired. Alternatively, a common mixing area may be used.

A load cell 800 may be positioned under each dispensing urn 730 such that the controller 760 may fill each urn 730 as desired. Each of the mixing nozzles 710 may be in the form of a conventional brew basket or the like. Any shape may be used herein. Any number of the mixing nozzles 710 and the dispensing urns 730 may be used herein. Each dispensing urn 730 may have a different type of beverage therein as desired.

Figure 11:
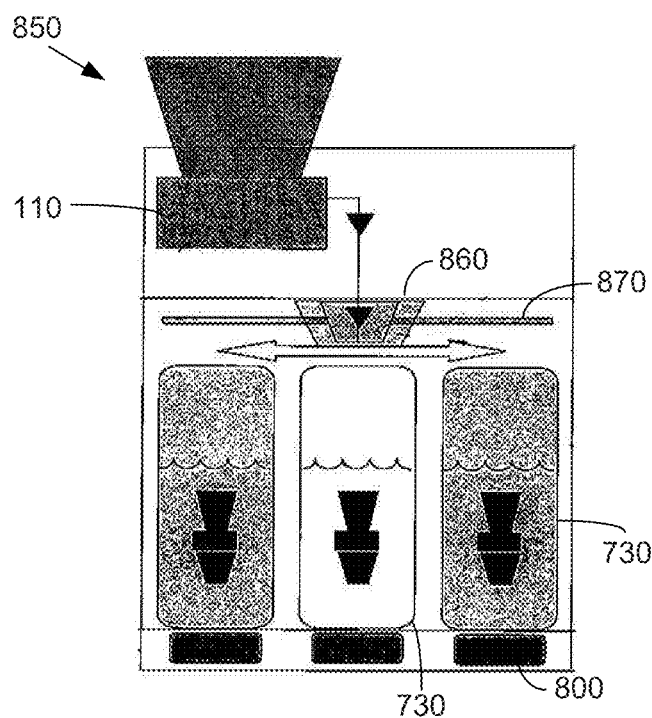
FIG. 11 is a schematic view of an alternative embodiment of the low pressure tea brewing system with a movable mixing nozzle.

FIG. 11 shows a further embodiment of a low pressure tea brewing system 850. In this embodiment, the low pressure tea brewing system 850 may include a moveable mixing nozzle 860. The moveable mixing nozzle 860 may be similar to the mixing nozzles 710 described above, but may be moveable or pivotable along a slide 870 or other device so as to be positioned about each of the dispensing urns 730. The controller 760 may direct the moveable mixing nozzle 860 to the desired dispensing urn 730. The moveable mixing nozzle 860 may be in the form of a conventional brew basket or the like. Any shape may be used herein. Any number of dispensing urns 730 may be used herein. Each dispensing urn 730 may have a different type of tea beverage therein as desired.

The ability to use multiple dispensing urns 730 thus may reduce the overall footprint of the low pressure tea brewing system 500, 810, 850 in terms of counter space and the like. The low pressure tea brewing system 500, 810, 850 also may provide a number of dispensing urns 730 with a different type of brewed tea therein. Smaller batches of tea also may be prepared so as to ensure freshness and a shorter hold time. The low pressure tea system 500, 810, 850 also may lock out further brewing during periods of low demand so as to signal a sanitation cycle. The low pressure tea brewing system 500, 810, 850 thus may provide operational efficiencies, optimize product yield, optimize sanitation frequency, conserve energy, and enable product reliability.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A beverage brewing system, comprising:
a concentrated beverage brewer;
one or more brew water circuits in communication with the concentrated beverage brewer;
one or more makeup water circuits; and
one or more back pressure valves in communication with the one or more brew water circuits and the one or more makeup water circuits upstream of the concentrated beverage brewer to maintain a substantially constant flow rate in light of a varying back pressure without a pump.

2. The beverage brewing system of claim 1, further comprising a mixing nozzle downstream of the concentrated beverage brewer.

3. The beverage brewing system of claim 2, wherein a first makeup water circuit of the one or more makeup water circuits is in communication with the concentrated beverage brewer and a second makeup water circuit of the one or more makeup water circuits may be in communication with the mixing nozzle.

4. The beverage brewing system of claim 2, further comprising one or more additive circuits with one of the one or more back pressure valves thereon in communication with the mixing nozzle.

5. The beverage brewing system of claim 4, wherein the one or more additive circuits comprise one or more sweetener circuits and one or more flavoring circuits.

6. The beverage brewing system of claim 1, wherein each of the one or more back pressure valves comprises a piston and a plurality of outlet ports.

7. The beverage brewing system of claim 1, wherein each of the one or more back pressure valves comprises a predetermined flow rate there through.

8. The beverage brewing system of claim 1, further comprising a removable dispensing urn.

9. The beverage brewing system of claim 8, further comprising a load cell associated with the removable dispensing urn.

10. The beverage brewing system of claim 1, further comprising a selection display.

11. The beverage brewing system of claim 1, further comprising a plurality of mixing nozzles downstream of the concentrated beverage brewer and in communication with the one or more makeup water circuits.

12. The beverage brewing system of claim 11, further comprising a plurality of dispensing urns downstream of the plurality of mixing nozzles.

13. The beverage brewing system of claim 1, further comprising a moveable mixing nozzle downstream of the concentrated beverage brewer and in communication with the one or more makeup water circuits.

14. The beverage brewing system of claim 13, further comprising a plurality of dispensing urns downstream of the moveable mixing nozzle.

15. The beverage brewing system of claim 1, further comprising a controller in communication with the concentrated beverage brewer and the one or more back pressure valves.

16. A beverage brewing system, comprising:
a concentrated beverage brewer;
one or more brew water circuits in communication with the concentrated beverage brewer;
one or more makeup water circuits;
one or more back pressure valves in communication with the one or more brew water circuits and the one or more makeup water circuits upstream of the concentrated beverage brewer to maintain a substantially constant flow rate in light of a varying back pressure without a pump; and
further comprising a regulator valve in communication with the one or more brew water circuits and the one or more makeup water circuits.

17. A low pressure brewing system, comprising:
a concentrated beverage brewer;
one or more brew water circuits in communication with the concentrated beverage brewer;
one or more makeup water circuits;
one or more additive circuits;
a first plurality of back pressure valves in communication with the one or more brew water circuits and the one or more makeup water circuits upstream of the concentrated beverage brewer to maintain a substantially constant flow rate in light of a varying back pressure without a pump;
a second plurality of back pressure valves in communication with the one or more additive circuits; and
a mixing nozzle in communication with the concentrated beverage brewer, the one or more makeup water circuits, and the one or more additive circuits.

18. The low pressure brewing system of claim 17, wherein a first makeup water circuit of the one or more makeup water circuits is in communication with the concentrated beverage brewer and a second makeup water circuit of the one or more makeup water circuits may be in communication with the mixing nozzle.

19. The low pressure brewing system of claim 17, further comprising a regulator valve in communication with the one or more brew water circuits and the one or more makeup water circuits.

20. The low pressure brewing system of claim 17, wherein each of the plurality of back pressure valves comprises a predetermined flow rate there through.

21. The low pressure brewing system of claim 17, further comprising a removable dispensing urn.

22. The low pressure brewing system of claim 21, further comprising a load cell associated with the removable dispensing urn.

* * * * *